(12) United States Patent
Donadei et al.

(10) Patent No.: US 8,328,916 B2
(45) Date of Patent: Dec. 11, 2012

(54) FILTER DEVICE FOR HYDROCARBON ADSORPTION

(75) Inventors: Olivier Donadei, Ennery (FR); Matthias Flach, Remseck (DE); Philippe Lalardie, Saint-Gratien (FR); Johann Lamotte, Beaumont sur Oise (FR); Valentin Ruffet, Rueil Malmaison (FR)

(73) Assignee: Mahle International GmbH (DE)

( * ) Notice: Subject to any disclaimer, the term of this patent is extended or adjusted under 35 U.S.C. 154(b) by 357 days.

(21) Appl. No.: 12/708,560

(22) Filed: Feb. 19, 2010

(65) Prior Publication Data
US 2010/0224069 A1      Sep. 9, 2010

(30) Foreign Application Priority Data

Feb. 20, 2009   (DE) .................. 10 2009 009 805

(51) Int. Cl.
*F02M 25/08*   (2006.01)
*B01D 53/04*   (2006.01)
(52) U.S. Cl. ............... 96/139; 96/152; 55/462; 55/464
(58) Field of Classification Search .............. 96/134, 96/139, 147, 148, 152, 396; 55/385.3, 392, 55/394, 434, 440, 462, 464
See application file for complete search history.

(56) References Cited

U.S. PATENT DOCUMENTS

| | | | | |
|---|---|---|---|---|
| 4,300,918 A | | 11/1981 | Cary | |
| 4,693,393 A | * | 9/1987 | DeMinco et al. | ............. 220/374 |
| 4,717,401 A | * | 1/1988 | Lupoli et al. | ................... 96/141 |
| 5,024,687 A | | 6/1991 | Waller | |
| 5,638,786 A | | 6/1997 | Gimby | |
| 5,912,368 A | * | 6/1999 | Satarino et al. | ................. 55/320 |
| 7,727,313 B2 | * | 6/2010 | Blackwood et al. | ........... 96/134 |
| 2004/0007135 A1 | | 1/2004 | Ikuma et al. | |
| 2004/0261777 A1 | * | 12/2004 | Ogawa | .......................... 123/698 |
| 2007/0245700 A1 | | 10/2007 | Zhu | |
| 2009/0133371 A1 | | 5/2009 | Siber | |
| 2009/0159039 A1 | | 6/2009 | Furuya | |

FOREIGN PATENT DOCUMENTS

| | | |
|---|---|---|
| DE | 102007056852 A1 | 5/2009 |
| EP | 0501540 A1 | 9/1992 |
| EP | 1 108 883 A2 | 6/2001 |
| EP | 1 502 793 A1 | 2/2005 |
| WO | WO-2007087102 A2 | 8/2007 |
| WO | WO-2008/106587 A1 | 9/2008 |

* cited by examiner

*Primary Examiner* — Frank Lawrence, Jr.
(74) *Attorney, Agent, or Firm* — Rader, Fishman & Grauer PLLC

(57) ABSTRACT

A hydrocarbon adsorption filter device comprising: a filter housing; at least one filter element with activated carbon arranged in the filter housing; an intake canal, connecting the filter housing with an environment, wherein fresh air is taken in during a flushing operation; and an intake canal housing cover, wherein the intake canal housing cover includes a labyrinthine canal structure having a first end and an opposing second end, wherein the first end is in communication with the intake canal while the second end is in communication with a floor-side opening of the housing.

20 Claims, 4 Drawing Sheets

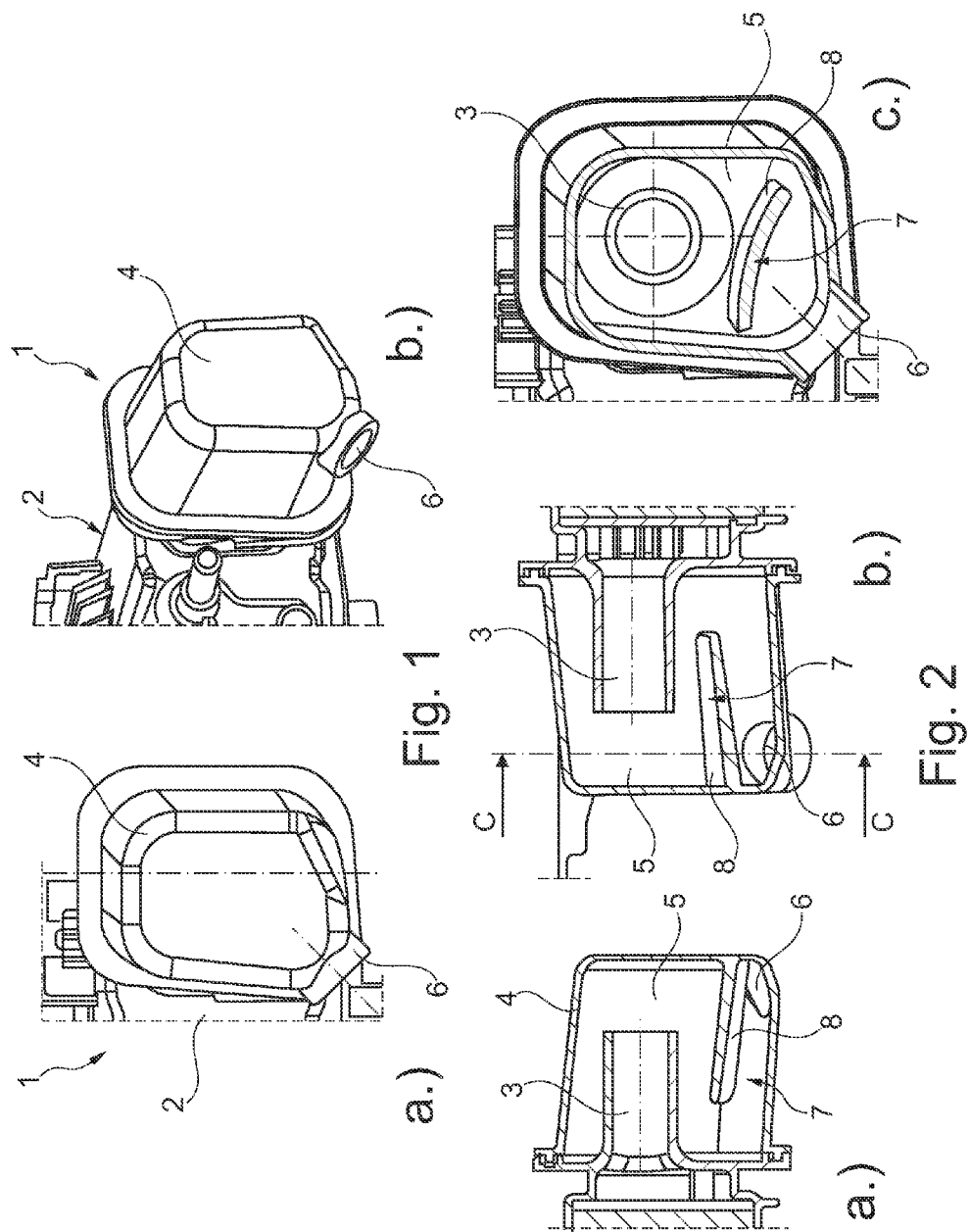

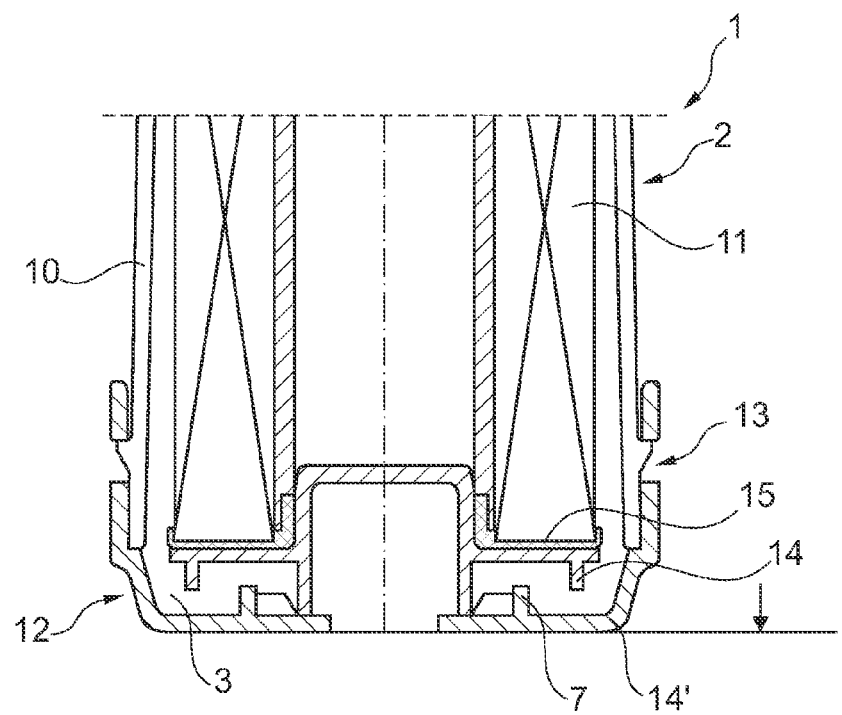
Fig. 3
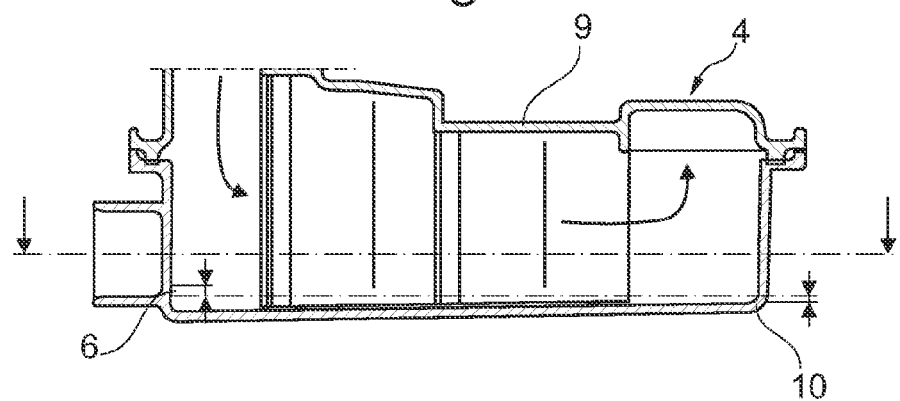
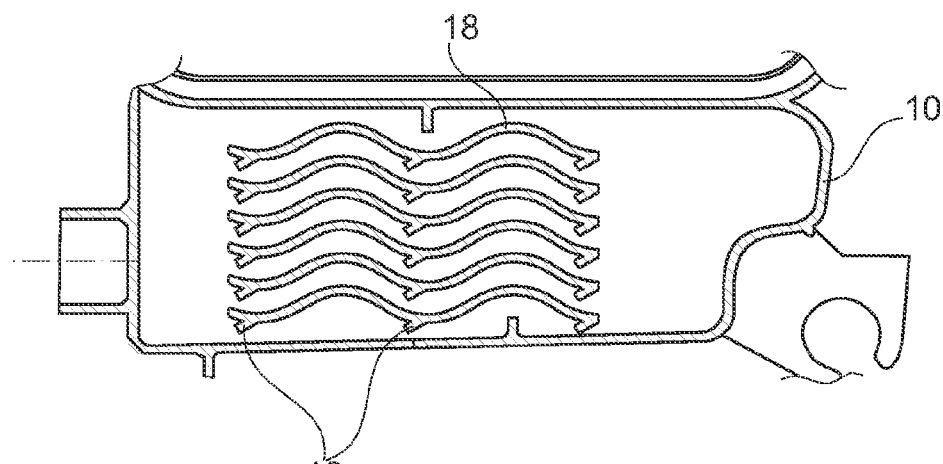
Fig. 4

FILTER DEVICE FOR HYDROCARBON ADSORPTION

CROSS-REFERENCES TO RELATED APPLICATIONS

This application claims priority to German patent application DE 10 2009 009 805.4 filed on Feb. 20, 2009, which is hereby incorporated by reference in its entirety.

TECHNICAL FIELD

The present invention relates to a filter device for hydrocarbon adsorption, in particular an air filter device.

BACKGROUND

Air filter devices for hydrocarbon adsorption in particular with a filter element having activated carbon are arranged in particular in the region of a tank vent in modern motor vehicles in order to prevent an uncontrolled escape of hydrocarbons into the environment. The activated carbon arranged in the filter device in turns absorbs the gaseous hydrocarbons escaping from the tank and delivers them again during operation to an internal combustion engine since it is then that the filter device is flushed in the opposite direction with fresh air. In order to be able to maintain the effectiveness of the activated carbon present in the filter device at a consistently high level for an extended period of time as well, it is necessary to protect it, particularly during the flushing operation, from a moist supply of fresh air. For this reason, long hoses, for example, are used in known filter devices, said hoses additionally forming a siphon with which it is attempted to reduce the moisture content of the air taken up during the flushing operation of the filter device. Disadvantageous with such hose solutions, however, is that their design is time-intensive and costly, while they furthermore require a considerable amount of space.

SUMMARY

The present invention therefore addresses the problem of providing for a filter device an improved embodiment that can be constructed in a more compact manner.

This problem is solved according to embodiments of the invention.

The invention is based on the general concept of providing in a known filter device for hydrocarbon adsorption, in particular in an air filter device, a housing that covers an intake canal and that has an internal, labyrinthine canal structure that is communicatingly connected on one end to the intake canal and is communicatingly connected on the other end to a floor-side opening of the housing. The actual filter device is thus connected by means of the intake canal to an environment by means of which it takes in fresh air during the flushing operation. With the labyrinthine canal structure of the intake canal-covering housing according to the invention, an effective reduction of the moisture of the intake air, that is to say an effective reduction of the water content of the intake air, can be achieved while exhibiting a considerably compact construction design at the same time. A filter element conventionally having activated carbon that is configured for the adsorption of hydrocarbons is arranged in a filter housing of the filter device. The labyrinthine canal structure within the housing attached to the intake canal forces the air that has been taken in to cover a considerably longer distance and to spend a considerably longer time within the housing both of which have positive effects on reducing the water content in the air that has been taken up. The opening arranged on the floor-side of the housing can be used not only as an inflow opening for taking up fresh air during the flushing operation but also at the same time as a water outflow opening through which precipitated water in the housing can flow off outward into the environment solely on the basis of gravity. Not only can an improvement with regard to the reduction of the water content of the air taken in and accordingly an improvement of the filter performance of the activated carbon thus be achieved with the housing according to the invention, but also a particularly compact method of construction can be achieved at the same time that is truly very advantageous in the light of the increasingly limited availability of space in an engine compartment.

In an advantageous development of the solution according to the invention, the housing is manufactured from plastic, in particular as a plastic injection moulded part, and forms an integral component of the filter housing of the filter device. It is thus conceivable that the housing is configured for water separation either as a separate component that can be connected or clipped in a subsequent and simple assembly process to the intake canal or to the filter housing of the filter device or else that the housing already forms an integral component of the filter housing of the filter device and thus can be manufactured or injection moulded together therewith in a single, shared production step. The last solution in particular offers a particularly cost-effective possibility for the manufacture of the filter device according to the invention.

In a further advantageous embodiment of the solution according to the invention, an impact surface is provided in the canal structure arranged opposite, particularly above, the floor-side opening. The air that is taken in during the flushing operation of the filter device and that is flowing into the housing thus flows against the impact wall, first water particles already separating on the impact wall, directly after which they can flow off downward through the opening and into the environment. The impact wall thus represents a first flow barrier within the canal structure that can of course additionally be covered by materials, such as fleece or the like, for example, that increase the water-separation properties. In general, the entire canal structure arranged in the housing is configured in such a manner that regardless of the separation location, separated water moves on the basis of gravity solely by itself downward to the floor-side opening, thereby being able to flow off toward the outside on its own based on gravity alone.

Additional important features and advantages of the invention can be found in the dependent claims, in the drawings and in the pertinent description of the figures with reference to the drawings.

It is understood that the features described above and those to be described in what follows can be used not only in the particular cited combination, but also in other combinations or independently without departing from the scope of the present invention.

BRIEF DESCRIPTION OF THE DRAWING

Preferred embodiments of the invention are shown in the drawings and are described in more detail in the following description, the same reference numerals referring to components which are the same or functionally the same or similar.

It is shown, respectively schematically, in

FIGS. 1a, b an exterior view onto a housing arranged according to the invention in a filter device, FIGS. 2*a-c* different sectional representations through the housing, FIG. 3 a labyrinthine canal structure that is formed by a filter bowl cover sealing the filter bowl on the floor side, FIG. 4 a further embodiment of a housing of the filter device, FIG. 5 a labyrinthine canal structure that is formed by cooperating labyrinth areas that are respectively formed on the filter bowl and on the cover, FIG. 6 a detail representation from FIG. 5, FIG. 7 a representation as in FIG. 5; however, of a different embodiment, FIG. 8 a detail representation from FIG. 7.

DETAILED DESRIPTION

Figure 5:
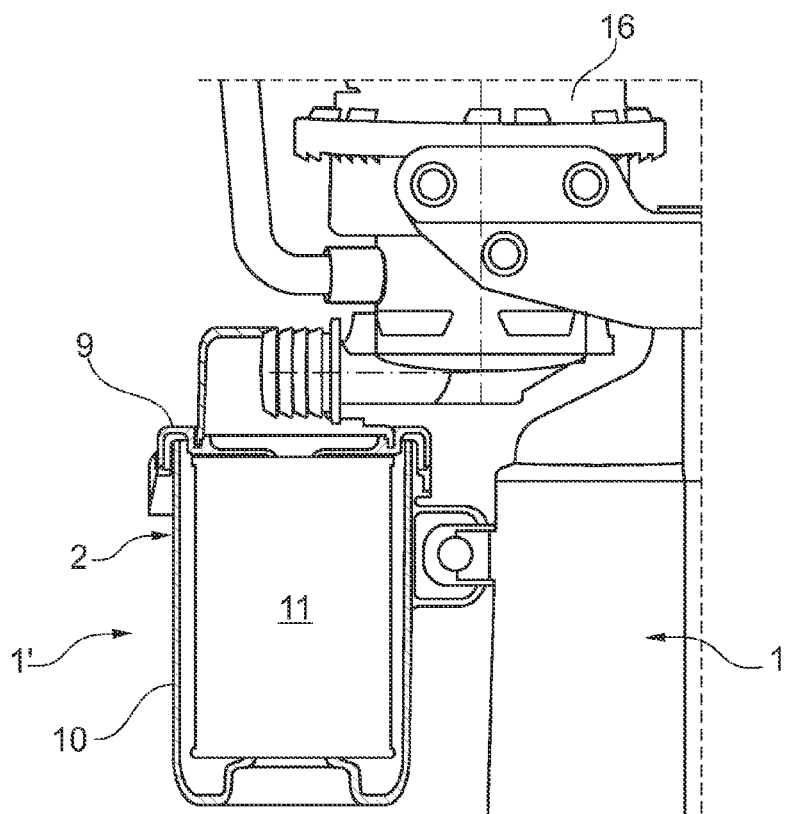

Corresponding to FIGS. 1*a* and 1*b*, a filter device 1 according to the invention for hydrocarbon adsorption, in particular an air filter device in the region of a tank vent, has a filter housing 2 in which at least one filter element having activated carbon is arranged. The filter housing 2 has an intake canal 3 (cf. FIGS. 2*a* to 2*c*) by means of which the filter device 1 is connected to an environment and furthermore by means of which fresh air can be taken in from outside during a flushing operation. While an internal combustion engine connected to the filter device 1 is idle, the intake canal 3 serves as a ventilation opening, in particular for ventilation of a tank, so that during the filling of the tank, for example, air can escape to the outside by means of the intake canal 3. Prior to this, the air laden with hydrocarbons is pressed through the activated carbon filter, the hydrocarbons being adsorbed by the activated carbon, so that preferably exclusively hydrocarbon-free air reaches the outside by means of the intake canal 3. During operation of the internal combustion engine, the activated carbon filter is flushed by the internal combustion engine taking in fresh air from the outside via the intake canal 3. The hydrocarbons absorbed in the activated carbon filter are conducted by the fresh air taken in to combustion in the internal combustion engine, the activated carbon filter thereby being regenerated anew on its own. In order to maintain as high a degree of absorption by the activated carbon filter, it is vital that when fresh air is taken in, that is to say during the flushing operation, that as far as possible, dry air with only a minimal moisture content is taken in. This has been effected up to now by lines, in particular hoses, attached on the intake canal 3, said lines furthermore forming a type of siphon. These hoses are, however, disadvantageous in that they require a considerable amount of space in an engine compartment that is already crowded as it is.

According to the invention, a housing 4 is now provided that covers the intake canal 3, said housing having in its interior a labyrinthine canal structure 5 that is communicatingly connected on one end to the intake canal 3 and is communicatingly connected on the other end to a floor-side opening 6 of the housing 4. The labyrinthine canal structure 5 lengthens the path that the fresh air, which was taken in during the flushing process of the filter device 1, has to travel to the intake canal 3 in such a manner that an already noticeable reduction of the moisture content of the fresh air taken in can be achieved owing to the extended flow path. The labyrinthine canal structure 5, which is entirely arranged within the housing 4, makes it possible for a more compact construction of the filter device 1 than was previously the case with solutions involving hoses. Water separated inside the housing 4 can furthermore flow downward out of the housing 4 through the floor-side opening 6 in the housing 4 owing solely to the force of gravity.

The housing 4 is preferably manufactured from plastic, in particular as a plastic injection moulded part, and forms in a particularly preferred embodiment an integral component of the filter housing 2. This makes it possible to manufacture the housing 4 together with the filter housing 2 in one shared production step, to which end only one corresponding injection moulding tool need be correspondingly altered. In a separate configuration of the housing 4, it is in contrast conceivable that it, as previously, replaces hoses arranged on the intake canal 3, thereby permitting a retrofitting of already manufactured filter devices. A separately manufactured housing 4 can be fastened onto the filter housing 2 by means of corresponding clips or locking contours.

An impact wall 7 is arranged within the canal structure 5 opposite, in particular above, the floor-side opening 6, said impact wall already effecting upon the flowing in of fresh air taken in through the opening 6 a pre-separation of aerosol water droplets dissolved in the fresh air. By inclining the impact wall 7, it is possible for the water that is pre-separated or accumulated thereon simply to flow downward through the opening 6. In principle, the entire canal structure 5 is configured in such a manner that regardless of the separation location of the water within the canal structure 5, it can flow downward toward the opening 6 without a problem. In looking at FIGS. 2*a* to 2*c*, it can be seen that the impact wall 7 is at least somewhat curved and furthermore that the impact wall 7 has ribs 8 that can assume the task of elements that guide flow. The impact wall 7 can of course also be covered with a material conducive to water separation.

Given that the floor-side opening 6 is arranged at the lowest point of the housing 4, the separated water in the housing 4 can continually runs off without accumulations of water forming within the housing 4. The filter housing 2 with which the housing 4 is connected, for example welded or clipped onto, can be arranged above or below the floor-side opening 6 depending on the requirement in the motor vehicle.

The filter device 1 according to the invention makes it possible for both an economical and effective water separation to be achieved by taking in fresh air, the separated water flowing out on its own by way of the opening 6 and not, as previously, having to be removed with a siphon during maintenance work. The configuration of the canal structure 5 within the housing 4 can, moreover, permit a considerably compact method of construction to be achieved, which is truly advantageous given today's very crowded engine compartments.

According to FIG. 3, a filter device 1, in particular a dust filter, having a filter housing 2 with a filter bowl 10 is shown, in which at least one filter element 11 is arranged. The labyrinthine canal structure 5 is formed by a filter bowl cover 12 sealing the filter bowl 10 on the floor side, said filter bowl cover can be configured as having two parts and locking to the filter bowl 10 by means of a locking connection 13. The one part 14 of the filter bowl cover 12 engages the filter element 11 and abuts an end section 15 thereof. The other part 14' of the filter bowl cover 12 pre-tensions by means of the locking connection 13 the part 14 against the filter element 11. The locking connection 13 is formed by locking elements on the filter bowl cover side and locking contours on the filter bowl side. The locking connection 13 can be configured as an easily releasable and easily mountable clip connection the components of which can be injection moulded onto the filter bowl 10 or onto the filter bowl cover 12. This filter device 1 is part of a module for treating air that is escaping from a tank and is loaded with hydrocarbons (see also FIGS. 5 to 8).

FIG. 4 shows a housing 4 that likewise has an opening 6 in the region of a floor, separated water being able to exit through said opening. Separator contours 18 are arranged within the housing 4, said contours likewise increasing the degree of water separation. The separator contours 18 are configured as having undulations and have interference contours 19 oriented in the direction opposite the flow. The separator contours 18 can form an integral component of a cover 9 or of a bowl 10. A water film forms on the separator contours 18 and can then flow outward in the direction of the floor-side opening 6 through the force of gravity. The surface of the separator contours 18 can be, for example, coated or contoured, which makes it easier for a water film to form.

Figure 6:
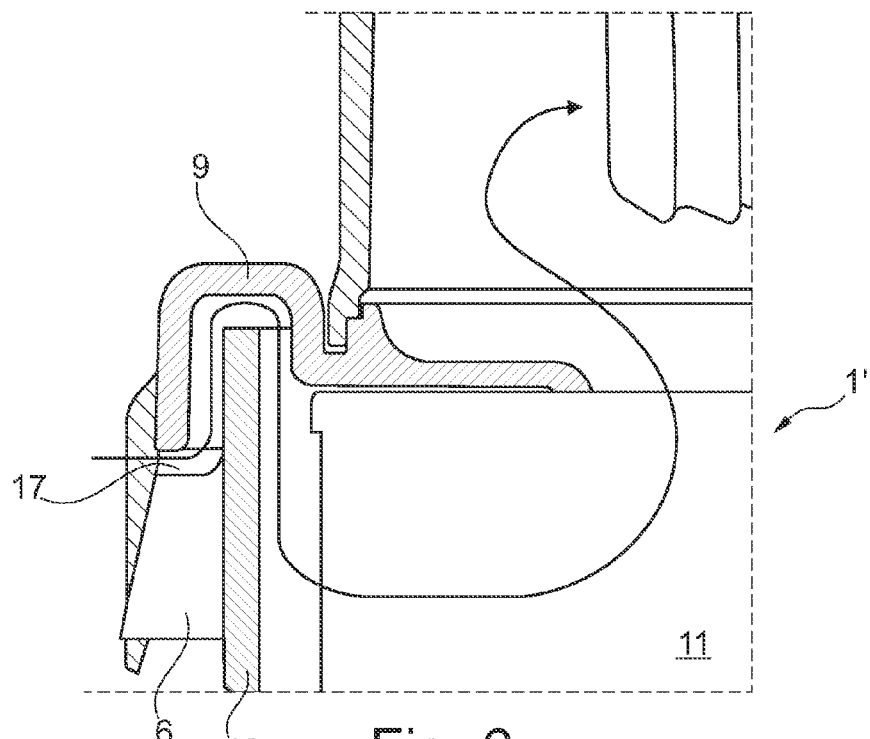

In FIGS. 5 and 6, a filter device 1', in particular a dust filter, that is integrated in the intake path of a filter device 1 having activated carbon for purification, is shown with a filter housing 2, which has a cover 9 and a filter bowl 10, in which at least one filter element 11 is arranged. The filter device 1' is connected with an environment by means of an annular gap 17 formed between the cover 9 and the filter bowl 10. The labyrinthine canal structure 5 according to the invention is associated with this annular gap 17, which canal structure serves to separate water and has at least one opening 6 for water to flow off. The labyrinthine canal structure 5 in this instance is formed by cooperating labyrinthine areas respectively configured on the filter bowl 10 and the cover 9. The annular gap 17 also results herefrom (cf. FIG. 6) through which fresh air is taken in. As can particularly be seen in FIG. 5, the filter device 1' is connected upstream from the diagnosis pump 16 that in turn is itself arranged upstream from the filter device 1. Together, the components yield a module for treating the air that is enriched with hydrocarbons and escapes from the tank.

Figure 7:
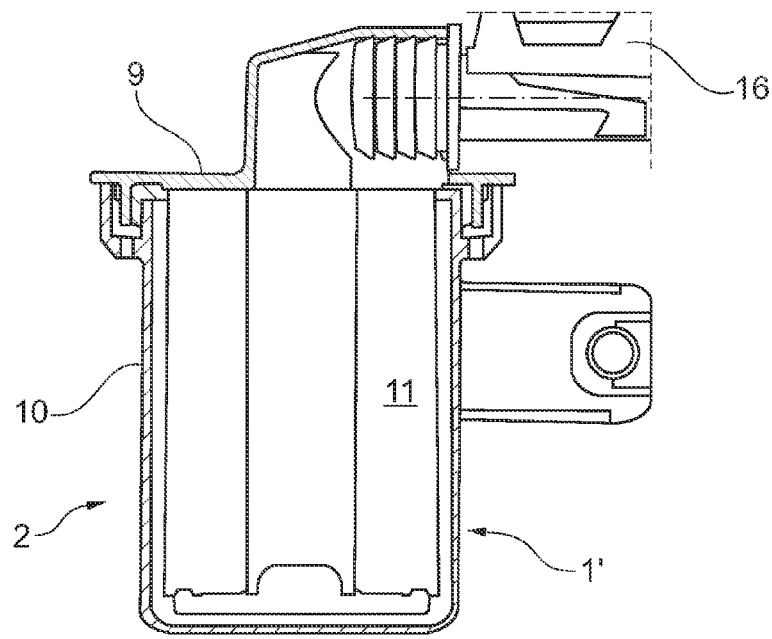
Figure 8:
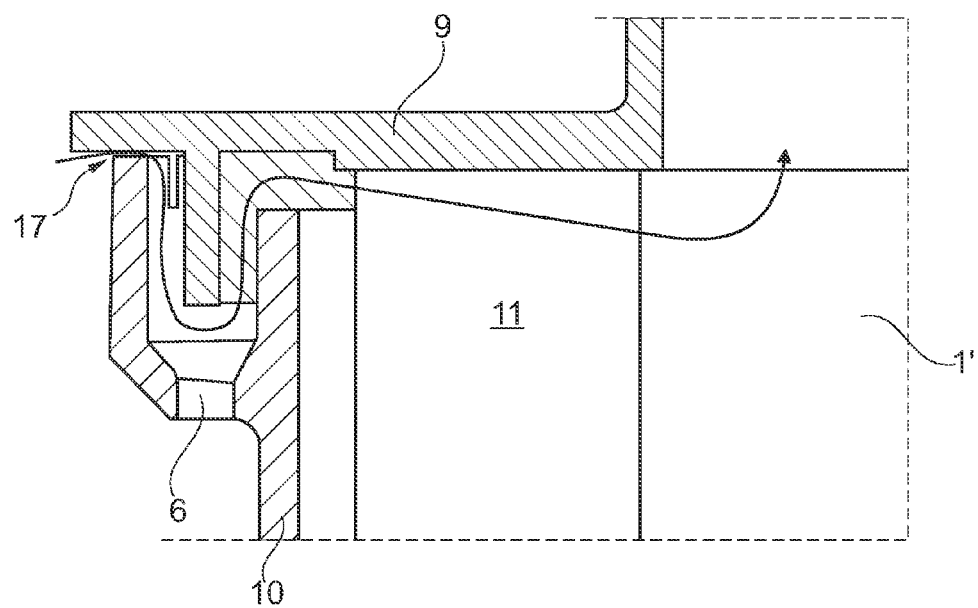

FIGS. 7 and 8 likewise show a filter device 1', in particular a dust filter, with a filter housing 2 having a cover 9 and a filter bowl 10, in which filter housing at least one filter element 11 is arranged. The filter device 1' is connected with an environment by means of an annular gap 17 formed between the cover 9 and the filter bowl 10. The labyrinthine canal structure 5 according to the invention is associated with this annular gap 17, which canal structure serves to separate water and has at least one floor-side opening 6 for water to flow off. The labyrinthine canal structure 5 in this instance is formed by cooperating labyrinthine areas respectively configured on the filter bowl 10 and the cover 9. The filter device 1' is also connected upstream from a diagnosis pump 16 that in turn is itself arranged upstream from the filter device 1. The respective filter devices 1' of FIGS. 7 and 5 are generally identically configured and differ from one another only in the design of the labyrinthine canal structure 5.

In principle, all filter devices 1 can be configured to adsorb hydrocarbons or, for example, can be configured as a dust filter, it being, for example, possible for the latter to be connected upstream from a diagnosis pump 16 that in turn is itself arranged upstream from an additional filter device 1. Such a diagnosis pump 16 can, for example, be used to carry out an "onboard diagnosis" during the operation of an internal combustion engine.

The dust filter/filter devices 1' shown in FIGS. 3 and 5 to 8 are part of a module for treating the air that is enriched with hydrocarbons and is furthermore escaping from the tank. A central component of this module is a filter device 1 that contains activated carbon, thereby making it possible for the hydrocarbons to be adsorbed. Should a diagnosis pump 16 be required for the diagnosis of the leakage during the operation of the motor vehicle, it is necessary to provide a filter device 1' in the intake path upstream from the filter device 1 and upstream from the diagnosis pump 16 since the diagnosis pump 16 would otherwise be damaged by the dust content in the fresh air taken in. In order to additionally prevent a moistening of the filter element 11 of the filter device 1', it is also logical in this case to provide a labyrinthine canal structure 5 according to the invention, that is to say a moisture trap.

The filter devices 1' shown in FIGS. 3 and 5 to 8 can be contained in a single housing together with the other components of the module for treating the air enriched with hydrocarbons and escaping from a tank in such a manner that in this instance as well, the labyrinthine canal structure 5 would be part of the housing of the filter device 1 or of the module. The precise configuration of this module for treating the air enriched with hydrocarbons that is escaping from a tank depends on the respective requirements of the different motor vehicles.

The invention claimed is:

1. A hydrocarbon adsorption filter device comprising:
a filter housing;
at least one filter element with activated carbon arranged in the filter housing;
an intake canal, wherein the intake canal connects the filter housing to an environment and fresh air is taken in during a flushing operation; and
an intake canal housing cover, wherein the intake canal housing cover includes a labyrinthine canal structure having a first end and an opposing second end, wherein the first end is in communication with the intake canal while the second end is in communication with a floor-side opening of the housing,
wherein one or more separator contours is arranged within the intake canal housing cover, one or more of the separator contours having undulations and having one or more interference contours oriented in a direction opposite a flow of separated water within the intake canal housing cover.

2. The hydrocarbon adsorption filter device as specified in claim 1, wherein the intake canal housing cover is a plastic injection moulded part.

3. The hydrocarbon adsorption filter device as specified in claim 1, wherein the intake canal housing forms an integral component of the filter housing.

4. The hydrocarbon adsorption filter device as specified in claim 1, wherein an impact wall is arranged within the canal structure opposite and above the floor-side opening.

5. The hydrocarbon adsorption filter device as specified in claim 4, wherein the impact wall is curved.

6. The hydrocarbon adsorption filter device as specified in claim 4, wherein the impact wall is ribbed.

7. The hydrocarbon adsorption filter device as specified in claim 1, wherein the floor-side opening is the lowest point of the housing such that water separated in the housing exits the housing through the floor-side opening.

8. A dust filter device comprising:
a filter housing, wherein the filter housing includes a cover, a filter bowl and at least one filter element;
an intake, wherein the filter device is connected to an environment; and
an intake side labyrinthine canal structure, wherein said canal structure includes at least one floor-side opening for water run-off,
wherein one or more separator contours is arranged within the cover, one or more of the separator contours having undulations and having one or more interference contours oriented in a direction opposite a flow of separated water within the cover.

9. The dust filter device as specified in claim 8, wherein the labyrinthine canal structure is formed by cooperating labyrinthine regions constructed on the filter bowl and on the cover, respectively.

10. The dust filter device as specified in claim 9, wherein the labyrinthine region that is constructed on the filter bowl is integral to the filter bowl; and the labyrinthine region that is constructed on the cover is integral to the cover.

11. The dust filter device as specified in claim 10, wherein the labyrinthine canal structure is formed by a filter bowl cover sealing the filter bowl on the floor side.

12. The dust filter device as specified in claim 11, wherein the floor-side filter bowl cover is constructed having at least two parts and is locked to the filter bowl by a locking connection.

13. The hydrocarbon adsorption filter device as specified in claim 2, wherein the intake canal housing forms an integral component of the filter housing.

14. The hydrocarbon adsorption filter device as specified in claim 2, wherein an impact wall is arranged within the canal structure opposite and above the floor-side opening.

15. The hydrocarbon adsorption filter device as specified in claim 3, wherein an impact wall is arranged within the canal structure opposite and above the floor-side opening.

16. The hydrocarbon adsorption filter device as specified in claim 5, wherein the impact wall is ribbed.

17. The hydrocarbon adsorption filter device as specified in claim 2, wherein the floor-side opening is the lowest point of the housing such that water separated in the housing exits the housing through the floor-side opening.

18. The hydrocarbon adsorption filter device as specified in claim 3, wherein the floor-side opening is the lowest point of the housing such that water separated in the housing exits the housing through the floor-side opening.

19. The hydrocarbon adsorption filter device as specified in claim 4, wherein the floor-side opening is the lowest point of the housing such that water separated in the housing exits the housing through the floor-side opening.

20. The hydrocarbon adsorption filter device as specified in claim 5, wherein the floor-side opening is the lowest point of the housing such that water separated in the housing exits the housing through the floor-side opening.

* * * * *